United States Patent
Ghag et al.

(10) Patent No.: US 12,445,380 B2
(45) Date of Patent: *Oct. 14, 2025

(54) HARDWARE ACCELERATION TECHNIQUES USING FLOW SELECTION

(71) Applicant: VMware LLC, Palo Alto, CA (US)

(72) Inventors: Aditi Ghag, Palo Alto, CA (US); Srividya Murali, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,978

(22) Filed: Mar. 14, 2024

(65) Prior Publication Data

US 2024/0223516 A1  Jul. 4, 2024

Related U.S. Application Data

(63) Continuation of application No. 16/890,890, filed on Jun. 2, 2020, now Pat. No. 11,962,518.

(51) Int. Cl.
| | | |
|---|---|---|
| *H04L 47/125* | (2022.01) | |
| *H04L 49/90* | (2022.01) | |
| *H04L 69/12* | (2022.01) | |
| *H04L 69/16* | (2022.01) | |
| *H04L 69/22* | (2022.01) | |
| *H04L 69/32* | (2022.01) | |

(52) U.S. Cl.
CPC ............ *H04L 47/125* (2013.01); *H04L 49/90* (2013.01); *H04L 69/12* (2013.01); *H04L 69/161* (2013.01); *H04L 69/22* (2013.01); *H04L 69/32* (2013.01)

(58) Field of Classification Search
CPC ....... H04L 49/90; H04L 47/125; H04L 69/12; H04L 69/161; H04L 69/22; H04L 69/32; H04L 47/2483; H04L 47/6205; H04L 49/508; H04L 67/60
See application file for complete search history.

(56) References Cited

U.S. PATENT DOCUMENTS

| | | |
|---|---|---|
| 5,668,810 A | 9/1997 | Cannella |
| 5,884,313 A | 3/1999 | Talluri et al. |
| | (Continued) | |

FOREIGN PATENT DOCUMENTS

| | | | |
|---|---|---|---|
| CA | 2672100 A1 | 6/2008 | |
| CA | 2918551 A1 | 7/2010 | |
| | (Continued) | | |

OTHER PUBLICATIONS

Angeles, Sara, "Cloud vs. Data Center: What's the difference?" Nov. 23, 2018, 1 page, retrieved from https://www.businessnewsdaily.com/4982-cloud-vs-data-center.html.

(Continued)

*Primary Examiner* — Shawn D Miller
(74) *Attorney, Agent, or Firm* — Quarles & Brady LLP

(57) ABSTRACT

In some embodiments, a method receives a packet for a flow associated with a workload. Based on an indicator for the flow, the method determines whether the flow corresponds to one of an elephant flow or a mice flow. Only when the flow is determined to correspond to an elephant flow, the method enables a hardware acceleration operation on the packet. The hardware acceleration operation may include hardware operation offload, receive side scaling, and workload migration.

20 Claims, 11 Drawing Sheets

(56) References Cited

U.S. PATENT DOCUMENTS

| | | |
|---|---|---|
| 5,887,134 A | 3/1999 | Ebrahim |
| 5,974,547 A | 10/1999 | Klimenko |
| 6,219,699 B1 | 4/2001 | McCloghrie et al. |
| 6,393,483 B1 | 5/2002 | Latif et al. |
| 6,496,935 B1 | 12/2002 | Fink et al. |
| 7,012,919 B1 | 3/2006 | So et al. |
| 7,079,544 B2 | 7/2006 | Wakayama et al. |
| 7,149,817 B2 | 12/2006 | Pettey |
| 7,149,819 B2 | 12/2006 | Pettey |
| 7,362,752 B1 | 4/2008 | Kastenholz |
| 7,370,120 B2 | 5/2008 | Kirsch et al. |
| 7,424,710 B1 | 9/2008 | Nelson et al. |
| 7,533,176 B2 | 5/2009 | Freimuth et al. |
| 7,606,260 B2 | 10/2009 | Oguchi et al. |
| 7,634,622 B1 | 12/2009 | Musoll et al. |
| 7,640,353 B2 | 12/2009 | Shen et al. |
| 7,849,168 B2 | 12/2010 | Utsunomiya et al. |
| 7,940,763 B1 | 5/2011 | Kastenholz |
| 8,004,990 B1 | 8/2011 | Callon |
| 8,355,328 B2 | 1/2013 | Matthews et al. |
| 8,442,059 B1 | 5/2013 | Iglesia et al. |
| 8,619,731 B2 | 12/2013 | Montemurro et al. |
| 8,660,129 B1 | 2/2014 | Brendel et al. |
| 8,819,259 B2 | 8/2014 | Zuckerman et al. |
| 8,825,900 B1 | 9/2014 | Gross et al. |
| 8,856,518 B2 | 10/2014 | Sridharan et al. |
| 8,931,047 B2 | 1/2015 | Wanser et al. |
| 8,976,814 B2 | 3/2015 | Dipasquale |
| 9,008,085 B2 | 4/2015 | Kamble et al. |
| 9,032,095 B1 | 5/2015 | Traina et al. |
| 9,116,727 B2 | 8/2015 | Benny et al. |
| 9,135,044 B2 | 9/2015 | Maharana |
| 9,143,582 B2 | 9/2015 | Banavalikar et al. |
| 9,152,593 B2 | 10/2015 | Galles |
| 9,154,327 B1 | 10/2015 | Marino et al. |
| 9,197,551 B2 | 11/2015 | DeCusatis et al. |
| 9,231,849 B2 | 1/2016 | Hyoudou et al. |
| 9,378,161 B1 | 6/2016 | Dalal et al. |
| 9,419,897 B2 | 8/2016 | Cherian et al. |
| 9,460,031 B1 | 10/2016 | Dalal et al. |
| 9,548,924 B2 | 1/2017 | Pettit et al. |
| 9,692,698 B2 | 6/2017 | Cherian et al. |
| 9,762,507 B1 | 9/2017 | Gandham et al. |
| 9,838,276 B2 | 12/2017 | Pettit et al. |
| 9,916,269 B1 | 3/2018 | Machulsky et al. |
| 9,967,199 B2 | 5/2018 | Lambeth et al. |
| 10,050,884 B1 | 8/2018 | Dhanabalan et al. |
| 10,142,127 B2 | 11/2018 | Cherian et al. |
| 10,158,538 B2 | 12/2018 | Pettit et al. |
| 10,193,771 B2 | 1/2019 | Koponen et al. |
| 10,284,478 B2 | 5/2019 | Yokota |
| 10,534,629 B1 | 1/2020 | Pierre et al. |
| 10,567,308 B1 | 2/2020 | Subbiah et al. |
| 10,666,530 B2 | 5/2020 | Koponen et al. |
| 10,997,106 B1 | 5/2021 | Bandaru et al. |
| 11,108,593 B2 | 8/2021 | Cherian et al. |
| 11,221,972 B1 | 1/2022 | Raman et al. |
| 11,385,981 B1 | 7/2022 | Silakov et al. |
| 11,467,873 B2 * | 10/2022 | Ganguli ............ G06F 15/17331 |
| 2002/0062422 A1 | 5/2002 | Butterworth et al. |
| 2002/0069245 A1 | 6/2002 | Kim |
| 2003/0063556 A1 | 4/2003 | Hernandez |
| 2003/0093341 A1 | 5/2003 | Millard et al. |
| 2003/0130833 A1 | 7/2003 | Brownell et al. |
| 2003/0140124 A1 | 7/2003 | Burns |
| 2003/0140165 A1 | 7/2003 | Chiu et al. |
| 2003/0145114 A1 | 7/2003 | Gertner |
| 2003/0191841 A1 | 10/2003 | DeFerranti et al. |
| 2003/0200290 A1 | 10/2003 | Zimmerman et al. |
| 2003/0217119 A1 | 11/2003 | Raman et al. |
| 2004/0264472 A1 | 12/2004 | Oliver et al. |
| 2005/0053079 A1 | 3/2005 | Havala |
| 2006/0029056 A1 | 2/2006 | Perera et al. |
| 2006/0041894 A1 | 2/2006 | Cheng et al. |
| 2006/0104286 A1 | 5/2006 | Cheriton |
| 2006/0140118 A1 | 6/2006 | Alicherry et al. |
| 2006/0206603 A1 | 9/2006 | Rajan et al. |
| 2006/0206655 A1 | 9/2006 | Chappell et al. |
| 2006/0236054 A1 | 10/2006 | Kitamura |
| 2006/0246900 A1 | 11/2006 | Zheng |
| 2006/0262778 A1 | 11/2006 | Haumont et al. |
| 2007/0174850 A1 | 7/2007 | Zur |
| 2007/0258382 A1 | 11/2007 | Foll et al. |
| 2007/0283412 A1 | 12/2007 | Lie et al. |
| 2008/0008202 A1 | 1/2008 | Terrell et al. |
| 2008/0086620 A1 | 4/2008 | Morris |
| 2008/0267177 A1 | 10/2008 | Johnson et al. |
| 2009/0006607 A1 | 1/2009 | Bu et al. |
| 2009/0046581 A1 | 2/2009 | Eswaran et al. |
| 2009/0089537 A1 | 4/2009 | Vick et al. |
| 2009/0119087 A1 | 5/2009 | Ang et al. |
| 2009/0161547 A1 | 6/2009 | Riddle et al. |
| 2009/0161673 A1 | 6/2009 | Breslau et al. |
| 2010/0070677 A1 | 3/2010 | Thakkar |
| 2010/0115208 A1 | 5/2010 | Logan |
| 2010/0157942 A1 | 6/2010 | An et al. |
| 2010/0165874 A1 | 7/2010 | Brown et al. |
| 2010/0257263 A1 | 10/2010 | Casado et al. |
| 2010/0275199 A1 | 10/2010 | Smith et al. |
| 2010/0287306 A1 | 11/2010 | Matsuda |
| 2011/0060859 A1 | 3/2011 | Shukla et al. |
| 2011/0085461 A1 | 4/2011 | Liu et al. |
| 2011/0164503 A1 | 7/2011 | Yong et al. |
| 2011/0219170 A1 | 9/2011 | Frost et al. |
| 2011/0249970 A1 | 10/2011 | Eddleston et al. |
| 2012/0042138 A1 | 2/2012 | Eguchi et al. |
| 2012/0054367 A1 | 3/2012 | Ramakrishnan et al. |
| 2012/0072909 A1 | 3/2012 | Malik et al. |
| 2012/0079478 A1 | 3/2012 | Galles et al. |
| 2012/0096459 A1 | 4/2012 | Miyazaki |
| 2012/0131222 A1 | 5/2012 | Curtis et al. |
| 2012/0163388 A1 | 6/2012 | Goel et al. |
| 2012/0167082 A1 | 6/2012 | Kumar et al. |
| 2012/0233349 A1 | 9/2012 | Aybay |
| 2012/0243539 A1 | 9/2012 | Keesara |
| 2012/0259953 A1 | 10/2012 | Gertner |
| 2012/0278584 A1 | 11/2012 | Nagami et al. |
| 2012/0287791 A1 | 11/2012 | Xi et al. |
| 2012/0320918 A1 | 12/2012 | Fomin et al. |
| 2013/0033993 A1 | 2/2013 | Cardona et al. |
| 2013/0058346 A1 | 3/2013 | Sridharan et al. |
| 2013/0061047 A1 | 3/2013 | Sridharan et al. |
| 2013/0064088 A1 | 3/2013 | Yu et al. |
| 2013/0073702 A1 | 3/2013 | Umbehocker |
| 2013/0125122 A1 | 5/2013 | Hansen |
| 2013/0145106 A1 | 6/2013 | Kan |
| 2013/0286846 A1 | 10/2013 | Atlas et al. |
| 2013/0287026 A1 | 10/2013 | Davie |
| 2013/0311663 A1 | 11/2013 | Kamath et al. |
| 2013/0318219 A1 | 11/2013 | Kancherla |
| 2013/0318268 A1 | 11/2013 | Dalal et al. |
| 2013/0322248 A1 | 12/2013 | Guo |
| 2014/0003442 A1 | 1/2014 | Hernandez et al. |
| 2014/0056151 A1 | 2/2014 | Petrus et al. |
| 2014/0067763 A1 | 3/2014 | Jorapurkar et al. |
| 2014/0074799 A1 | 3/2014 | Karampuri et al. |
| 2014/0098815 A1 | 4/2014 | Mishra et al. |
| 2014/0108738 A1 | 4/2014 | Kim et al. |
| 2014/0115578 A1 | 4/2014 | Cooper et al. |
| 2014/0123211 A1 | 5/2014 | Wanser et al. |
| 2014/0173018 A1 | 6/2014 | Westphal et al. |
| 2014/0208075 A1 | 7/2014 | McCormick, Jr. |
| 2014/0215036 A1 | 7/2014 | Elzur |
| 2014/0233421 A1 | 8/2014 | Matthews |
| 2014/0244983 A1 | 8/2014 | McDonald et al. |
| 2014/0245296 A1 | 8/2014 | Sethuramalingam et al. |
| 2014/0269712 A1 | 9/2014 | Kidambi |
| 2014/0269754 A1 | 9/2014 | Eguchi et al. |
| 2014/0372616 A1 | 12/2014 | Arisoylu et al. |
| 2015/0007317 A1 | 1/2015 | Jain |
| 2015/0016255 A1 | 1/2015 | Bisht et al. |
| 2015/0016300 A1 | 1/2015 | Devireddy et al. |
| 2015/0019748 A1 | 1/2015 | Gross, IV et al. |
| 2015/0020067 A1 | 1/2015 | Brant et al. |

(56) References Cited

U.S. PATENT DOCUMENTS

| | | |
|---|---|---|
| 2015/0033222 A1 | 1/2015 | Hussain et al. |
| 2015/0052280 A1 | 2/2015 | Lawson |
| 2015/0071072 A1 | 3/2015 | Ratzin et al. |
| 2015/0106804 A1 | 4/2015 | Chandrashekhar et al. |
| 2015/0117445 A1 | 4/2015 | Koponen et al. |
| 2015/0120959 A1 | 4/2015 | Bennett et al. |
| 2015/0124825 A1 | 5/2015 | Dharmapurikar et al. |
| 2015/0156250 A1 | 6/2015 | Varshney et al. |
| 2015/0163117 A1 | 6/2015 | Lambeth et al. |
| 2015/0163142 A1 | 6/2015 | Pettit et al. |
| 2015/0163144 A1 | 6/2015 | Koponen et al. |
| 2015/0163145 A1 | 6/2015 | Pettit et al. |
| 2015/0163146 A1 | 6/2015 | Zhang et al. |
| 2015/0172075 A1 | 6/2015 | DeCusatis et al. |
| 2015/0172183 A1 | 6/2015 | DeCusatis et al. |
| 2015/0180769 A1 | 6/2015 | Wang et al. |
| 2015/0200808 A1 | 7/2015 | Gourlay et al. |
| 2015/0212892 A1 | 7/2015 | Li et al. |
| 2015/0215207 A1 | 7/2015 | Qin et al. |
| 2015/0222547 A1 | 8/2015 | Hayut et al. |
| 2015/0237097 A1 | 8/2015 | Devireddy et al. |
| 2015/0242134 A1 | 8/2015 | Takada et al. |
| 2015/0261556 A1 | 9/2015 | Jain et al. |
| 2015/0261720 A1 | 9/2015 | Kagan et al. |
| 2015/0341247 A1 | 11/2015 | Curtis et al. |
| 2015/0347231 A1 | 12/2015 | Gopal et al. |
| 2015/0358288 A1 | 12/2015 | Jain et al. |
| 2015/0358290 A1 | 12/2015 | Jain et al. |
| 2015/0381494 A1 | 12/2015 | Cherian et al. |
| 2015/0381495 A1 | 12/2015 | Cherian et al. |
| 2016/0006696 A1 | 1/2016 | Donley et al. |
| 2016/0092108 A1 | 3/2016 | Karaje et al. |
| 2016/0127227 A1 | 5/2016 | Lee et al. |
| 2016/0134511 A1 | 5/2016 | Wang et al. |
| 2016/0134702 A1 | 5/2016 | Gertner |
| 2016/0162302 A1 | 6/2016 | Warszawski et al. |
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0306648 A1 | 10/2016 | Deguillard et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0118090 A1 | 4/2017 | Pettit et al. |
| 2017/0161090 A1 | 6/2017 | Kodama |
| 2017/0161189 A1 | 6/2017 | Gertner |
| 2017/0214549 A1 | 7/2017 | Yoshino et al. |
| 2017/0295033 A1 | 10/2017 | Cherian et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0095872 A1 | 4/2018 | Dreier et al. |
| 2018/0109471 A1 | 4/2018 | Chang et al. |
| 2018/0152540 A1 | 5/2018 | Niell et al. |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331961 A1 | 11/2018 | Andrew et al. |
| 2018/0331976 A1 | 11/2018 | Pope et al. |
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0075063 A1 | 3/2019 | McDonnell et al. |
| 2019/0132296 A1 | 5/2019 | Jiang et al. |
| 2019/0140924 A1 | 5/2019 | Koponen et al. |
| 2019/0158396 A1 | 5/2019 | Yu et al. |
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1 | 9/2019 | Hyoudou |
| 2019/0286373 A1 | 9/2019 | Karumbunathan et al. |
| 2019/0306083 A1 | 10/2019 | Shih et al. |
| 2019/0354406 A1* | 11/2019 | Ganguli ............... G06F 9/5011 |
| 2020/0021532 A1 | 1/2020 | Borikar et al. |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |
| 2020/0133909 A1 | 4/2020 | Hefty et al. |
| 2020/0136996 A1 | 4/2020 | Li et al. |
| 2020/0213227 A1 | 7/2020 | Pianigiani et al. |
| 2020/0259731 A1 | 8/2020 | Sivaraman et al. |
| 2020/0278892 A1 | 9/2020 | Nainar et al. |
| 2020/0278893 A1 | 9/2020 | Niell et al. |
| 2020/0314011 A1 | 10/2020 | Deval et al. |
| 2020/0319812 A1 | 10/2020 | He et al. |
| 2020/0328192 A1 | 10/2020 | Zaman et al. |
| 2020/0351181 A1 | 11/2020 | Koponen et al. |
| 2020/0382329 A1 | 12/2020 | Yuan |
| 2020/0401320 A1 | 12/2020 | Pyati et al. |
| 2020/0412659 A1 | 12/2020 | Arditti Ilitzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0314232 A1 | 10/2021 | Nainar et al. |
| 2021/0357242 A1 | 11/2021 | Ballard et al. |
| 2021/0377166 A1 | 12/2021 | Brar et al. |
| 2021/0392017 A1 | 12/2021 | Cherian et al. |
| 2021/0409317 A1 | 12/2021 | Seshan et al. |
| 2022/0027147 A1 | 1/2022 | Maddukuri et al. |
| 2022/0043572 A1 | 2/2022 | Said et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0210229 A1 | 6/2022 | Maddukuri et al. |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1 | 1/2023 | Liu et al. |

FOREIGN PATENT DOCUMENTS

| | | |
|---|---|---|
| CN | 101258725 A | 9/2008 |
| CN | 101540826 A | 9/2009 |
| DE | 102018004046 A1 | 11/2018 |
| EP | 1482711 A2 | 12/2004 |
| EP | 3598291 A1 | 1/2020 |
| EP | 4160424 A2 | 4/2023 |
| TW | 202107297 A | 2/2021 |
| WO | 2004047377 A2 | 6/2004 |
| WO | 2005099201 A2 | 10/2005 |
| WO | 2007036372 A1 | 4/2007 |
| WO | 2010008984 A2 | 1/2010 |
| WO | 2016003489 A1 | 1/2016 |
| WO | 2020027913 A1 | 2/2020 |
| WO | 2021030020 A1 | 2/2021 |

OTHER PUBLICATIONS

Anwer, Muhammad Bilal, et al., "Building A Fast, Virtualized Data Plane with Programmable Hardware," Aug. 17, 2009, 8 pages, VISA'09, ACM, Barcelona, Spain.

Author Unknown, "Transparent," Free On-Line Dictionary of Computing (FOLDOC), Jun. 6, 1996, 1 page, retrieved from http://foldoc.org/transparent.

Author Unknown, "Network Functions Virtualisation; Infrastructure Architecture; Architecture of the Hypervisor Domain," Draft ETSI GS NFV-INF 004 V0.3.1, May 28, 2014, 50 pages, France.

(56) References Cited

OTHER PUBLICATIONS

Author Unknown, "What is End-to-End Encryption and How does it Work?," Mar. 7, 2018, 4 pages, Proton Technologies AG, Geneva, Switzerland.
Author Unknown, "An Introduction to SmartNICs" The Next Platform, Mar. 4, 2019, 4 pages, retrieved from https://www.nextplatform.com/2019/03/04/an-introduction-to-smartnics/.
Author Unknown, "In-Hardware Storage Virtualization—NVMe SNAP™ Revolutionizes Data Center Storage: Composable Storage Made Simple," Month Unknown 2019, 3 pages, Mellanox Technologies, Sunnyvale, CA, USA.
Author Unknown, "Middlebox," Wikipedia, Nov. 19, 2019, 1 page, Wikipedia.com.
Author Unknown, "vSAN Planning and Deployment" Update 3, Aug. 20, 2019, 85 pages, VMware, Inc., Palo Alto, CA, USA.
Author Unknown, "Hypervisor," Aug. 13, 2020, 1 page, VMware.com.
Author Unknown, "Package Manager," Wikipedia, Sep. 8, 2020, 10 pages.
Author Unknown, "VMDK", Wikipedia, May 17, 2020, 3 pages, retrieved from https://en.wikipedia.org/w/index.php?title=VMDK&oldid=957225521.
Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.
Doyle, Lee, "An Introduction to smart NICs and their Benefits," Jul. 2019, 2 pages, retrieved from https://www.techtarget.com/searchnetworking/tip/An-introduction-to-smart-NICs-and-ther-benefits.
Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.
Harris, Jim, "Accelerating NVME-oF* for VMs with the Storage Performance Development Kit," Flash Memory Summit, Aug. 2017, 18 pages, Intel Corporation, Santa Clara, CA.
Herbert, Tom, et al., "Scaling in the Linux Networking Stack", https://www.kernel.org/doc/Documentation/networking/scaling.txt, Jun. 2, 2020, 9 pages.
Koponen, Teemu, et al., "Network Virtualization in Multi-tenant Datacenters," Technical Report TR-2013-001E, Aug. 2013, 22 pages, VMware, Inc., Palo Alto, CA, USA.
Le Vasseur, Joshua, et al., "Standardized but Flexible I/O for Self-Virtualizing Devices," Month Unknown 2008, 7 pages.
Li, Junnan, et al., "DrawerPipe: A Reconfigurable Pipeline for Network Processing on FGPA-Based SmartNIC," Electronics 2020, Dec. 10, 2019, 24 pages, retrieved from https://www.mdpi.com/2079-9292/9/1/59.
Liu, Ming, et al., "Offloading Distributed Applications onto SmartNICs using iPipe," SIGCOMM '19, Aug. 19-23, 2019, 16 pages, ACM, Beijing, China.
Mohammadkhan, Ali, et al., "P4NFV: P4 Enabled NFV Systems with SmartNICs," 2019 IEEE Conference on Network Function Virtualization and Software Defined Networks (NFV-SDN), Nov. 12-14, 2019, 7 pages, IEEE, Dallas, TX, USA.
Olds, Dan, "OS Virtualization vs. Hypervisor: Why You Should Offer Both," Oct. 19, 2008, 3 pages, techtarget.com.
Perlroth, Nicole, "What is End-to-End Encryption? Another Bull's-Eye on Big Tech," The New York Times, Nov. 19, 2019, 4 pages, retrieved from https://nytimes.com/2019/11/19/technology/end-to-end-encryption.html.
Peterson, Larry L., et al., "OS Support for General-Purpose Routers," Month Unknown 1999, 6 pages, Department of Computer Science, Princeton University.
Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.
Spalink, Tammo, et al., "Building a Robust Software-Based Router Using Network Processors," Month Unknown 2001, 14 pages, ACM, Banff, Canada.
Stringer, Joe, VMware, "OVS Hardware Offloads Discussion Panel", http://www.openvswitch.org//support/ovscon2016/7/1450-stringer.pdf, 37 pages.
Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
"8.6. Receive Side-Scaling (RSS)", https://access.redhat.com/documentation/en-us/red_hat_enterprise_linux/6/html/performance_tuning_guide/network-rss, Jun. 2, 2020, 2 pages.

* cited by examiner

HARDWARE ACCELERATION TECHNIQUES USING FLOW SELECTION

CROSS-REFERENCE TO RELATED APPLICATION

This application is a continuation of U.S. patent application Ser. No. 16/890,890 filed on Jun. 2, 2020, the disclosure of which is incorporated by reference herein.

BACKGROUND

Physical network interface cards (PNICs) may offer hardware acceleration techniques to offload processing of packets using the hardware of the PNICs. When enabled, a system may select packets of some flows to be processed using the hardware acceleration techniques in place of processing the packets in a network stack in software. In some cases, applying the hardware acceleration techniques to process packets in the PNIC may improve network performance because the PNIC can perform the processing of the packets faster in hardware compared to in software. However, PNICs may have limitations around the number of flows that can be processed using the hardware acceleration techniques. Also, the amount of network performance improvement may not be maximized if flows that are offloaded to the PNIC do not benefit much from using the hardware acceleration techniques.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

Hardware acceleration techniques using a physical network interface card (PNIC) may enhance the processing of packets that are associated with flows. In some embodiments, the hardware acceleration techniques may include hardware flow offloading and receive side scaling (RSS). Hardware flow offloading is a technique where processing of flows in software is offloaded to the PNIC for processing. Then, the PNIC performs some operations to process packets for the flow. The processing of the packets in hardware may be faster than processing the packets in software. Receive side scaling distributes receive side network traffic across multiple queues that are exposed by the PNIC. Some embodiments enhance receive side scaling processes to intelligently assign queues to flows.

In some embodiments, a system assigns the hardware acceleration techniques to packets of flows based on a classification associated with the flows. In some embodiments, a first classification may be referred to as an "elephant flow" and a second classification may be associated with a "mice flow". An elephant flow may have characteristics in which the flows may be relatively long-lived and are throughput intensive whereas the mice flows may include characteristics in which the flows are short-lived and send very little data. The system may apply the hardware acceleration techniques to flows that are classified as elephant flows. For example, the system offloads elephant flows to the PNIC for packet processing whereas mice flows are not offloaded to the PNIC and are processed in the network stack in software. In receive side scaling, the system may map elephant flows to separate queues that are dedicated to processing elephant flows. Elephant flows may introduce head-of-line blocking delays for the queue, which means that processing of the packets for an elephant flow in the queue may block processing for packets for mice flows that are in the same queue. By mapping elephant flows to separate queues that do not include packets for mice flows, delays for mice flows may be avoided.

System Overview

Figure 1:
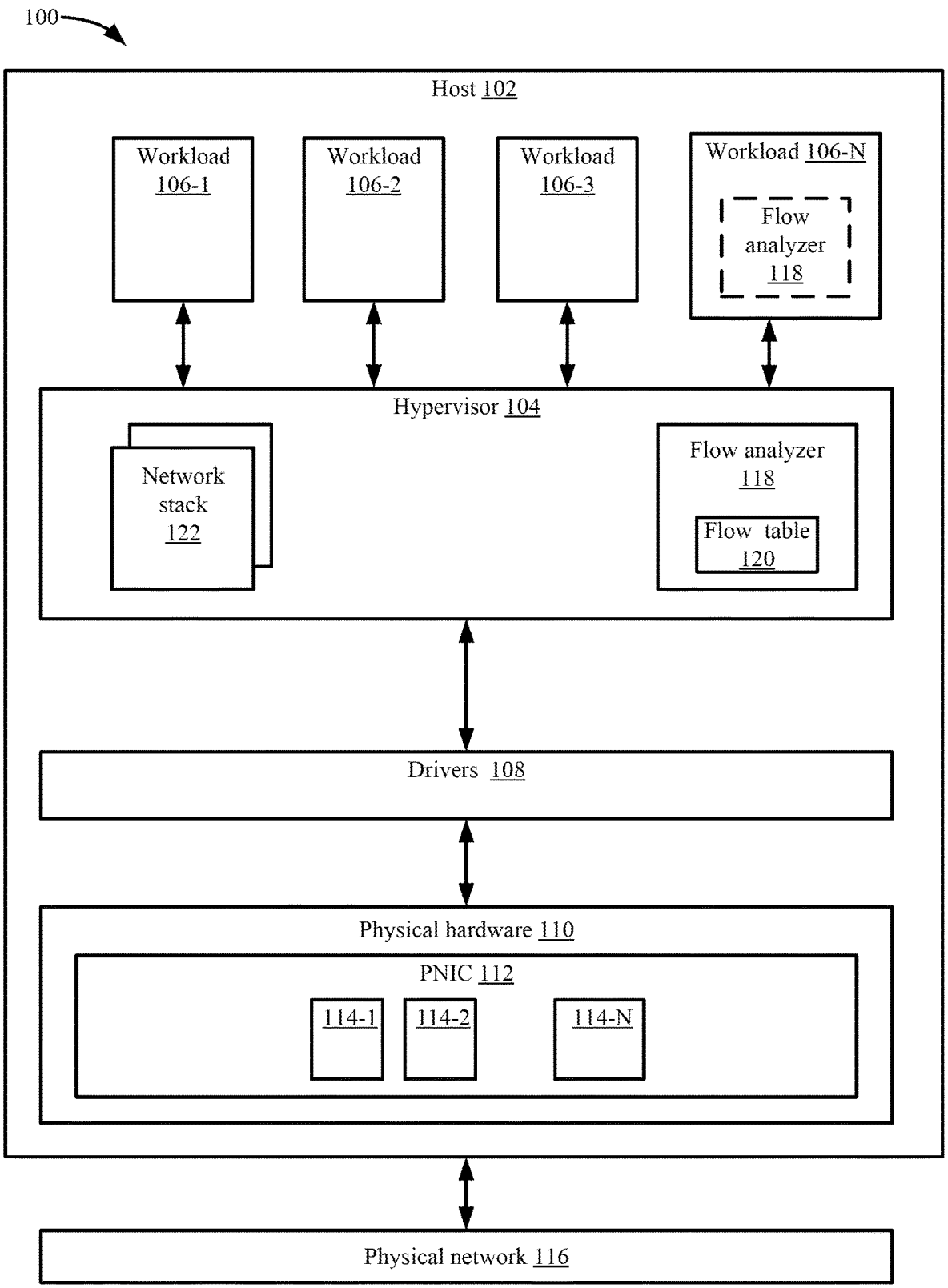
FIG. 1 depicts a simplified system for performing hardware acceleration techniques by classifying flows according to some embodiments.

FIG. 1 depicts a simplified system 100 for performing hardware acceleration techniques by classifying flows according to some embodiments. A host 102 may be linked to other devices, such as other hosts, through a physical network 116. Host 102 may perform processing of network traffic (e.g., packets).

Host 102 may include a hypervisor 104 and workloads 106-1 to 106-N. Workloads may refer to virtual machines that are running on a respective host, but this is one example of a virtualized computing instance or compute node. Any suitable technology may be used to provide a workload. Workloads may include not only virtual machines, but also containers (e.g., running on top of a host or guest operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers. Although a virtualized environment is described, some embodiments may be used in an environment that is not virtualized. Also, the term "workload" may refer to a host that is not virtualized.

Host 102 provides resources to allow workloads 106 to send and receive packets to and from physical network 116. In some embodiments, hypervisor 104 includes a network stack 122 for each workload 106 that processes packets for workloads 106. Network stack 122 may perform operations on the packets in software using hypervisor 104. The operations that are performed may be defined by protocols, such as Transfer Control Protocol (TCP)/Internet Protocol (IP). Network stack 122 may include an input/output (I/O) chain that may perform network operations related to the delivery and receipt of packets as well as other operations.

Host 102 also includes physical hardware 110, which includes hardware devices for host 102, such as computer processing units (CPUs), storage, etc. Physical hardware 110 also includes a physical network interface card (PNIC) 112. PNIC 112 may be the physical interface for host 102 to physical network 116. For example, PNIC 112 is an interface that is used to send packets from workloads 106 to physical network 116 and also to receive packets from physical network 116 that are destined for workloads 106. In the receive scenario, PNIC 112 includes queues 114-1 to 114-N that store packets that are received. Queues 114 buffer the incoming packets that are received from physical network 116, but queues 114 may also perform other operations. Then, drivers 108 read the packets corresponding to queues 114 for further processing by network stack 122. Note that the above explanation, and other explanations herein, may reflect a common interpretation or abstraction of actual processing mechanisms. For instance, packets may not actually be stored in queues, but instead descriptors or pointers to packets (that are actually stored in host memory) may be stored in the queue. It is conventional to refer to these descriptors/pointers that identify a packet as the packet themselves to abstract away complexity and explain higher level operations without burdening the reader with unnecessary technical details of well understood mechanisms. Such abstractions in the descriptions herein should not be construed as limiting in any way.

A flow analyzer 118 may analyze packets for flows to classify the flows. Flow analyzer 118 may be implemented in hypervisor 104, such as in a kernel module. However, flow analyzer 118 may be implemented in other areas, such as in user space or in a workload 106-N. In some embodiments, flow analyzer 118 classifies a flow in a first classification, such as an elephant flow classification. Flows not classified in a first classification may be considered classified in a second classification, such as a mice flow. However, other classifications may also be used. As discussed above, an elephant flow may be associated with a longer-lived flow that sends a larger amount of network traffic compared to a mice flow that may be short-lived and send very little network traffic. For example, an elephant flow may be associated with a high-volume connection that includes continuous traffic being sent. A mice flow may only send a short burst of network traffic. The mice flow may be associated with a latency-sensitive application where packet delays affect the performance of the application, whereas elephant flows may be associated with large data transfers in which throughput is more important than latency.

Flow analyzer 118 may classify a flow as an elephant flow using different techniques. In some embodiments, flow analyzer 118 may track an amount of data, such as a number of bytes, that is sent in a flow and determine whether the flow should be classified as an elephant flow based on the amount of data that is sent. In some embodiments, flow analyzer 118 tracks each flow and checks whether a number of bytes has reached a certain threshold. When a threshold limit is met (e.g., the amount is greater than a threshold), flow analyzer 118 determines that this flow is an elephant flow. Although this technique of detecting an elephant flow is described, other techniques may be used, such as machine learning to classify flows. Further examples of detecting elephant flows may be disclosed in U.S. Pat. No. 10,193,771, entitled "Detecting and Handling Elephant Flows", filed Mar. 31, 2014, which claims priority to U.S. Provisional Application No. 61/913,899, filed on Dec. 9, 2013, both of which are incorporated by reference herein in their entirety.

When flow analyzer 118 detects an elephant flow, flow analyzer 118 may input an entry in flow table 120 that identifies the flow. Flow table 120 may be a software flow table used by hypervisor 104 or a hardware flow table used by PNIC 112. In some embodiments, a tuple, such as a 5-tuple, is used to identify the flow. The 5-tuple may include a source IP address, a destination IP address, a destination port, a source port, and a protocol that is associated with packets sent in the flow. However, other ways of identifying a flow may be appreciated.

Flow analyzer 118 may intercept packets from workloads 106 and determine whether the packets are associated with a flow in flow table 120 that is classified as an elephant flow. Then, as will be described in more detail below, flow analyzer 118 may perform a hardware acceleration technique, such as performing hardware flow offloading or may tag a packet such that receive side scaling can be performed. Further, PNIC 112 may receive packets for workloads 106 and determine whether the packets are associated with a flow in flow table 120 that is classified as an elephant flow. When associated with a flow in flow table 120, PNIC 112 may perform a hardware acceleration technique.

The following will describe the flow analysis to determine elephant flows, and then processes of hardware flow offloading and receive side scaling will be described in more detail.

Flow Analysis

Figure 2A:
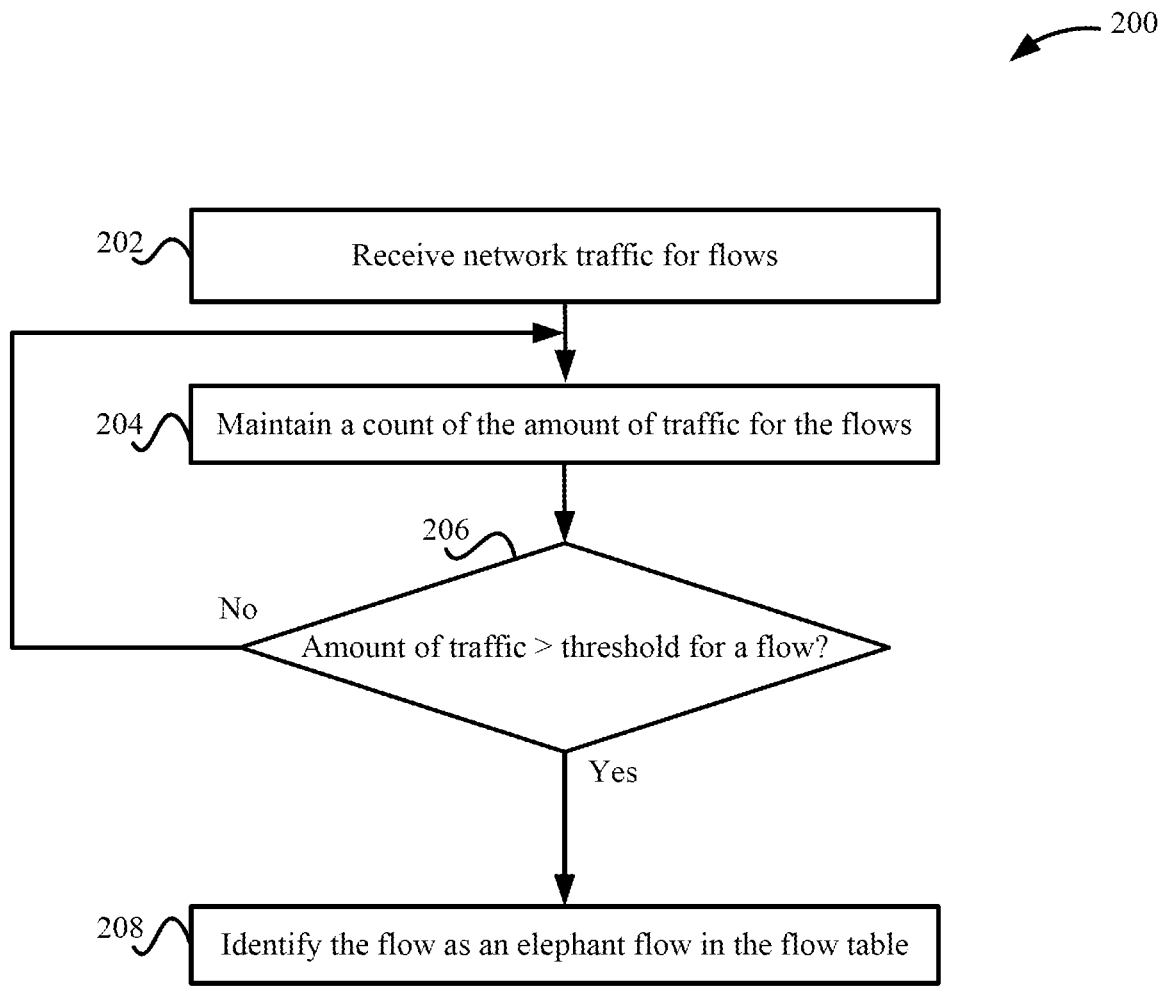
FIG. 2A depicts a simplified flowchart of a method for analyzing flows to identify elephant flows according to some embodiments.

Flow analyzer 118 may classify flows as elephant flows dynamically in real-time after the flows are established. Alternatively, workloads may be tagged as having elephant flows and all flows established for tagged workloads may be tagged as elephant flows automatically without the need for analysis of data being transferred through the flows. FIG. 2A depicts a simplified flowchart 200 of a method for analyzing flows to identify elephant flows according to some embodiments. At 202, upon initialization of a workload 106, flow analyzer 118 receives network traffic for flows. For example, a flow is initialized and starts to transfer packets between a source and destination.

Flow analyzer 118 then analyzes the network traffic of the flow. For example, at 204, flow analyzer 118 may maintain a count of the amount of traffic for the flows. As discussed above, flow analyzer 118 may keep track of the amount of data being sent in a flow and compare that amount of data to a threshold. At 206, flow analyzer 118 determines whether a flow should be classified as an elephant flow. If a flow is not considered an elephant flow (e.g., the amount of data has not met the threshold), the process reiterates to 204 where additional network traffic for flows is analyzed.

At 208, if a flow is considered an elephant flow (e.g., the amount of data has met the threshold), flow analyzer 118 identifies the flow as an elephant flow in flow table 120. The identification may be based on a tuple for the flow as discussed above, and flow analyzer 118 inserts the tuple into flow table 120.

The flows that are identified in flow table 120 may be used to perform hardware flow offloading and receive side scaling. In hardware flow offloading, flow analyzer 118 may identify elephant flows in flow table 120 and offload processing of packets for the flow to PNIC 112. In receive side scaling, flow analyzer 118 may add tags to packets being sent to identify the packets as being associated with an elephant flow. A PNIC 112 that receives the packet may then store the packet in a queue 114 based on the tag. For example, PNIC 112 may store packets that are associated with elephant flows in designated queues 114 that process packets for elephant flows and not packets for mice flows. The following describes both hardware flow offloading and receive side scaling in more detail.

In additional to identifying specific flows for workloads as elephant flows, flow analyzer 118 may tag a workload as being associated with elephant flows in flow table 120. In this case, all flows for a workload may be identified as being elephant flows in flow table 120. For example, when a workload 106 is migrated from a first host to second host, the second host may tag all flows associated with that workload 106 as being elephant flows. Also, at a future time, when a flow is created for a tagged workload 106, flow analyzer 118 may automatically designate the created flow in flow table 120 as an elephant flow upon the flow being initialized. That is, flow analyzer 118 may not analyze the network traffic of the flow to determine whether the flow is an elephant flow. Because workload 106 is tagged, flow analyzer 118 assumes the flow is an elephant flow. Flow analyzer 118 may store identification information (e.g., a tuple) for the flows in flow table 120 to identify the flows as elephant flows.

Figure 2B:
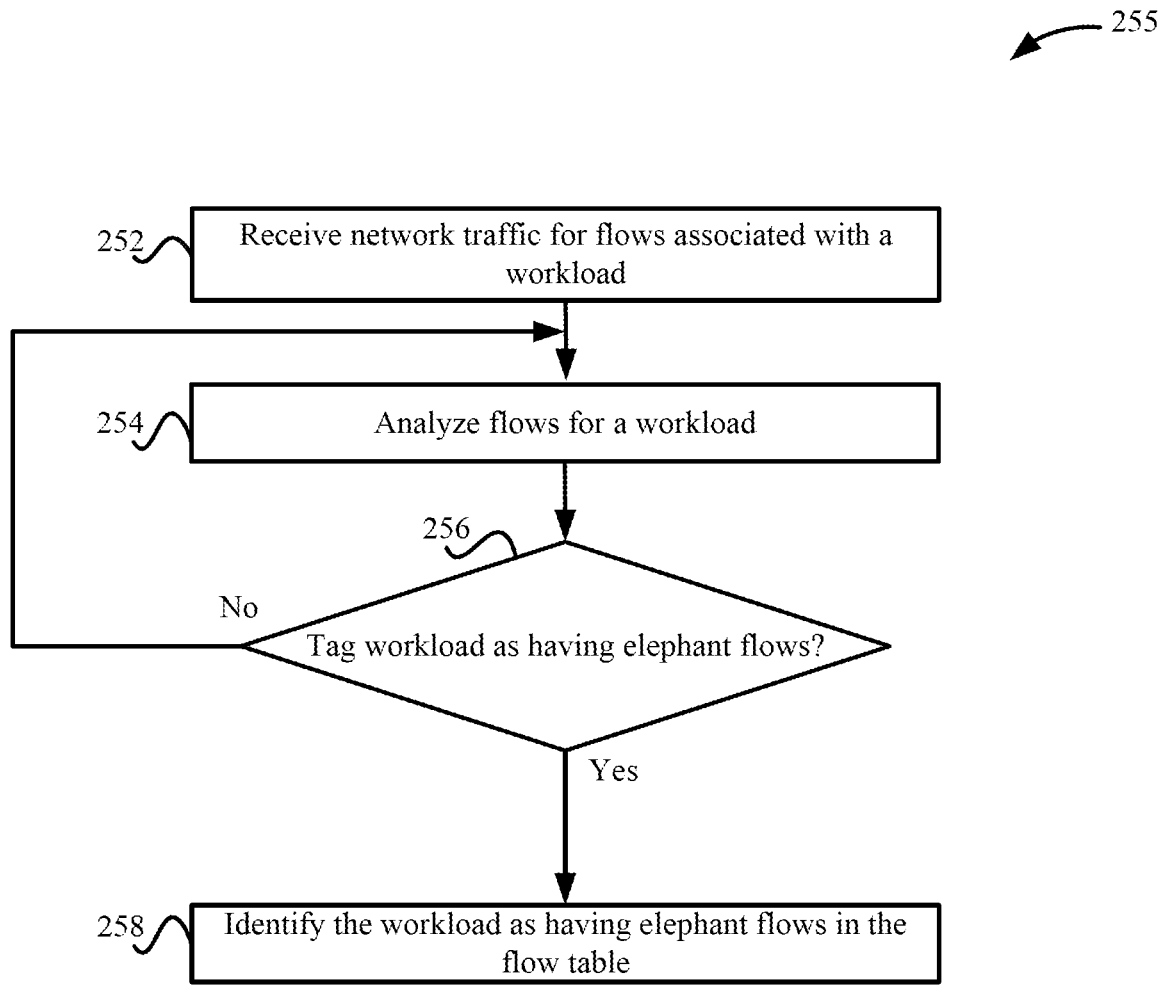
FIG. 2B depicts a simplified flowchart to determine whether to tag workloads as having elephant flows according to some embodiments.

FIG. 2B depicts a simplified flowchart 250 to determine whether to tag workloads 106 as having elephant flows according to some embodiments. At 252, flow analyzer 118 receives network traffic for flows. At 254, flow analyzer 118 analyzes flows for a workload. At 256, flow analyzer 118 determines whether to tag workload 106 as an elephant flow. Flow analyzer 118 may determine whether a workload 106 is designated as having elephant flows using different techniques. For example, when workload 106 includes a number of flows that are designated as elephant flows that meets a threshold (e.g., five flows), flow analyzer 118 may tag the workload as having elephant flows. However, flow analyzer 118 may tag a workload when a single flow is identified as an elephant flow. Also, flow analyzer 118 may tag the workload as having elephant flows when an aggregate amount of data is processed in all flows associated with workload 106.

If workload 106 is not tagged, the process reiterates to 254 to continue to analyze flows. However, if workload 106 is to be tagged, at 258, flow analyzer 118 may identify workload 106 in flow table 120 as having elephant flows. For example, flow analyzer 118 may insert an identifier (e.g., a tuple including an IP address and/or a media access control (MAC) address) for a workload into flow table 120 when the workload is designated as having elephant flows. Since workload 106 is tagged as having elephant flows, existing flows for that workload may be tagged as elephant flows in flow table 120. For example, flow analyzer 118 identifies any flows for the tagged workload as elephant flows in flow table 120, such as by storing a tuple for each flow in flow table 120.

Hardware Acceleration Operation

Figure 3A:
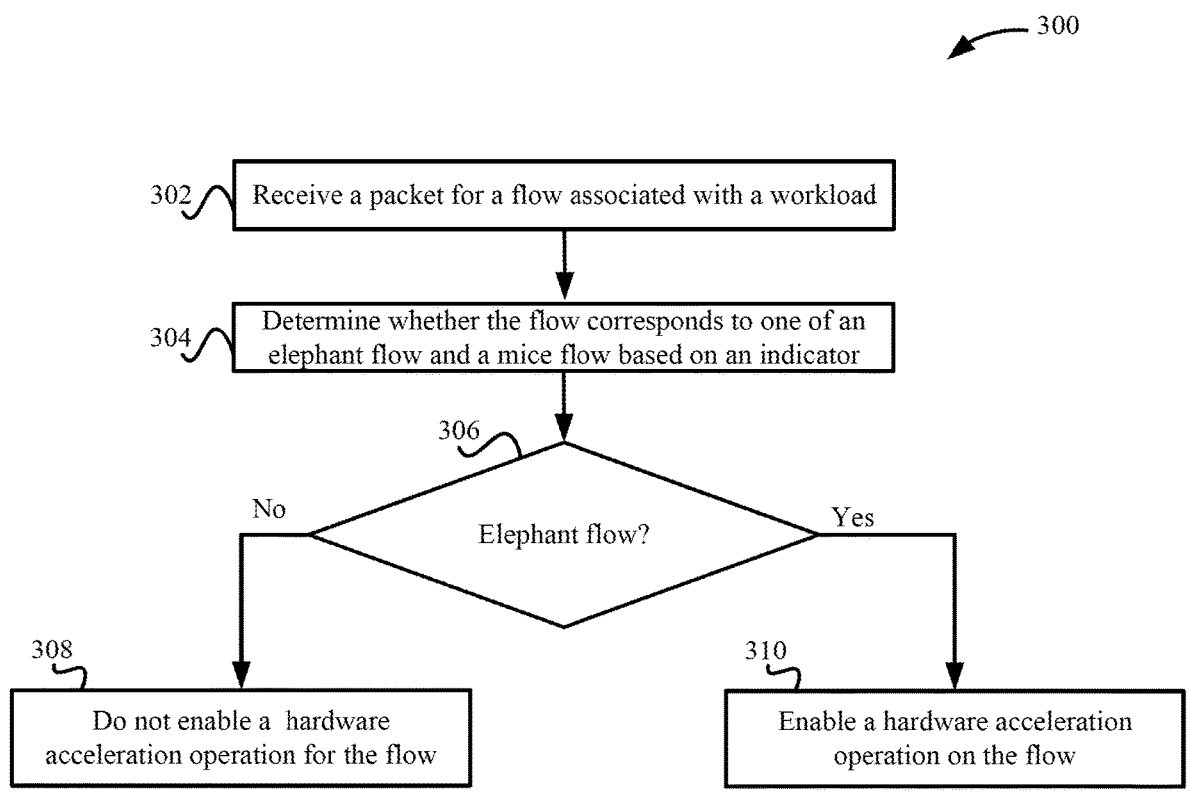
FIG. 3A depicts a simplified flowchart of a method for performing hardware acceleration operations for elephant flows according to some embodiments.

As will be discussed in more detail below, different hardware acceleration techniques may be performed. The following generally describes performing a hardware acceleration operation, which may use an indicator to perform different hardware acceleration techniques. FIG. 3A depicts a simplified flowchart 300 of a method for performing hardware acceleration operations for elephant flows according to some embodiments. At 302, host 102 receives a packet for a flow associated with a workload 106. In some embodiments, flow analyzer 118 intercepts packets that are from a workload 106 or are destined for a workload 106. For example, flow analyzer 118 may include hooks into network stack 122, which cause packets to be re-directed to flow analyzer 118. Various techniques may be used such that packets for flows are intercepted by flow analyzer 118. In other examples, PNIC 112 receives the packet.

At 304, host 102 determines whether the flow corresponds to one of an elephant flow and a mice flow based on an indicator. In some embodiments, the indicator may be a tag for the flow or workload 106 that indicates the flow is associated with an elephant flow. Flows may be tagged if associated with an elephant flow or not tagged if not associated with an elephant flow. Also, the packet may be tagged itself as will be discussed below in receive side scaling.

At 306, host 102 determines whether the packet is associated with an elephant flow. If not, at 308, host 102 does not enable a hardware acceleration technique. Rather, host 102 processes the packet through network stack 122 in hypervisor 104. That is, host 102 processes the packet using software in hypervisor 104. Upon processing the packet, if the packet is being sent from workload 106 for a destination, driver 108 sends the packet to PNIC 112, which sends the packet to the destination, such as to physical network 116 for delivery to another host 102 or another workload. If the packet is being sent to workload 106, hypervisor 104 sends the packet to workload 106.

However, if the packet is associated with an elephant flow, at 310, host 102 enables a hardware acceleration operation on the packet. As will be discussed in more detail below, the operation may be part of a hardware offload operation or a receive side scaling operation.

Hardware Flow Offloading

Figure 3B:
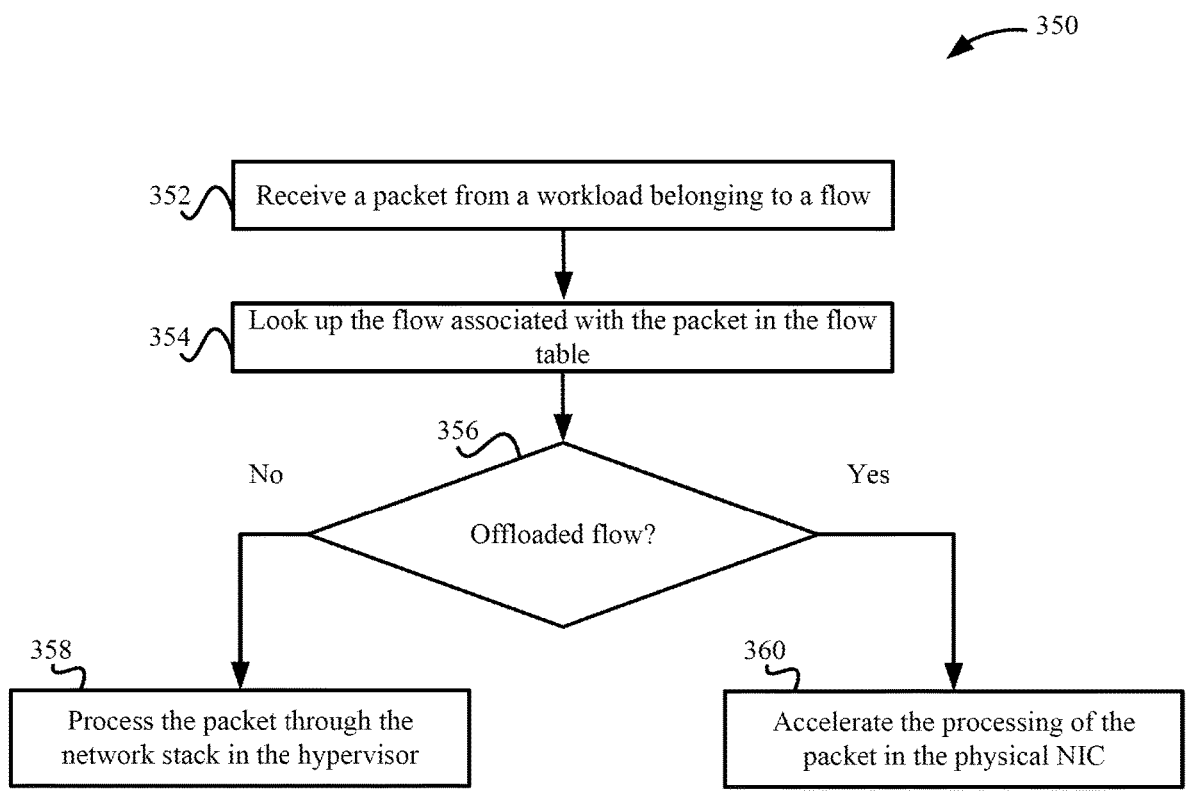
FIG. 3B depicts a simplified flowchart of a method for performing hardware flow offloading for packets sent by a workload according to some embodiments.

The following method describes processing performed when workload 106 sends a packet. FIG. 3B depicts a simplified flowchart 350 of a method for performing hardware flow offloading for packets sent by workload 106 according to some embodiments. At 352, flow analyzer 118 receives a packet for a flow sent by a workload 106. At 354, flow analyzer 118 looks up the flow associated with the packet in flow table 120, which may be a software flow table in this case. For example, flow analyzer 118 may compare information from the packet to information stored for flows in flow table 120. In some embodiments, flow analyzer 118 determines a tuple for the packet, which may include a source IP address, a destination IP address, a source port, a destination port, and a protocol. In some embodiments, flow table 120 may only list elephant flows. Thus, if the tuple exists in flow table 120, then flow analyzer 118 determines that the packet is associated with an elephant flow. In other examples, flow table 120 may store flows of different classifications, such as for both elephant flows and mice flows. In this case, flow analyzer 118 may determine a classification type (e.g., elephant or mice) for a matched flow and verify the classification is for an elephant flow. The indicator in this case may be the identification of the flow in flow table 120.

At 356, flow analyzer 118 determines whether the packet is an offloaded flow, which is a flow that was classified as an elephant flow. If the packet is not associated with an offloaded flow, at 358, flow analyzer 118 processes the packet through network stack 122 in hypervisor 104.

At 360, if the packet is associated with an offloaded flow, flow analyzer 118 accelerates the processing of the packet in PNIC 112. For example, flow analyzer 118 offloads at least a part of the processing of the packet to PNIC 112. In some embodiments, if PNIC 112 can perform all the operations of network stack 122, PNIC 112 processes the packet entirely and can deliver the packet to the destination or to workload 106. This hardware offload may skip the processing of network stack 122 entirely. In other examples, not all of the packet processing may be performed in PNIC 112. For example, for some operations, packet processing may be offloaded to PNIC 112. The operations that can be performed by PNIC 112 may vary based on configuration, such as some PNICs 112 may be able to perform only certain operations. In this case, network stack 122 may perform some operations, but then when an operation is reached that can be performed by PNIC 112, hypervisor 104 offloads the operation to PNIC 112. When PNIC 112 finishes the processing, if further operations need to be performed in network stack 122, those operations are processed in network stack 122. In some examples, PNIC 112 may be capable of encapsulation and decapsulation of a packet. When encapsulation or decapsulation is needed, hypervisor 104 offloads the encapsulation or decapsulation of the packet to PNIC 112. Then, the other operations may or may not be performed in network stack 122.

Figure 3C:
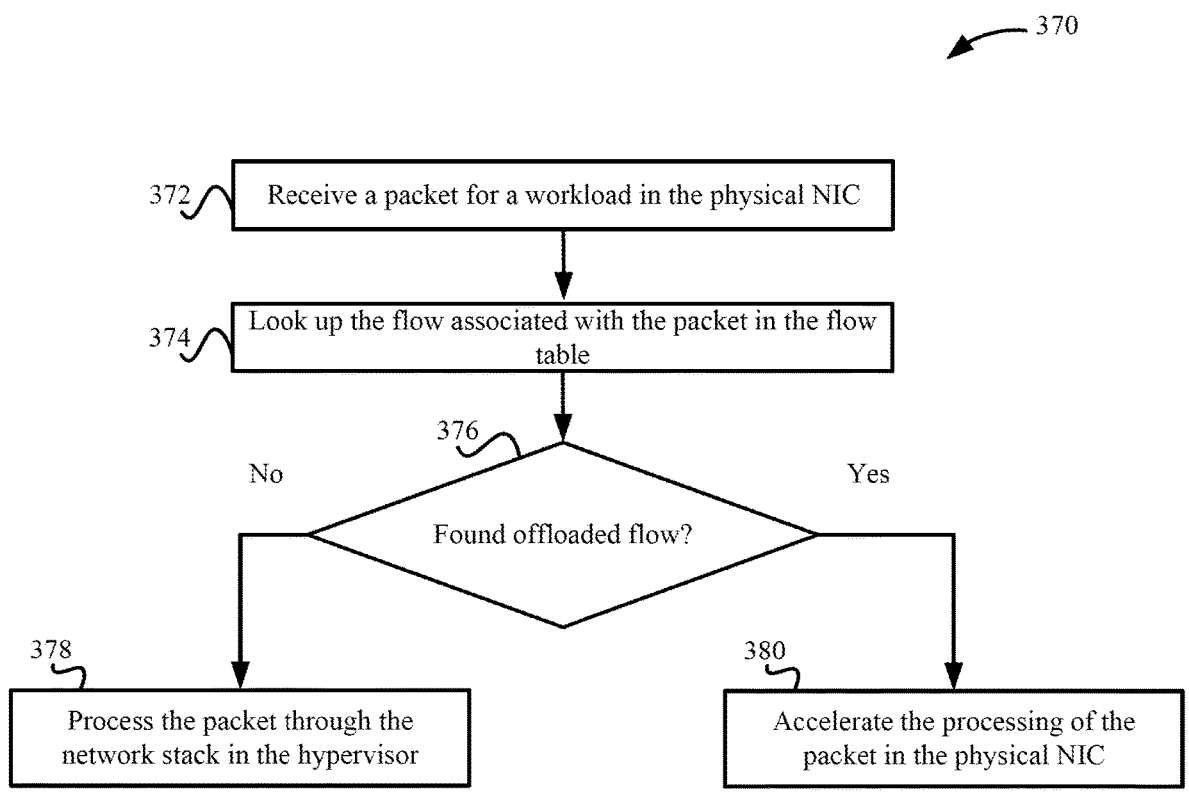
FIG. 3C depicts a simplified flowchart of a method for performing hardware flow offloading for packets received at a host for a workload according to some embodiments.

The following describes the processing of packets received at host 102 for workload 106. FIG. 3C depicts a simplified flowchart 370 of a method for performing hardware flow offloading for packets received at host 102 for workload 106 according to some embodiments. At 372, PNIC 112 receives a packet for a flow that is destined for a workload 106. At 374, PNIC 112 looks up the flow associated with the packet in flow table 120, which may be a hardware flow table in this case. A similar process as described above may be used to determine whether the packet is associated with a flow in flow table 120 and thus is associated with an elephant flow.

At 376, flow analyzer 118 determines whether the packet is an offloaded flow, which is a flow that was classified as an elephant flow. If the packet is not associated with an offloaded flow, at 378, flow analyzer 118 processes the packet through network stack 122 in hypervisor 104.

At 380, if the packet is associated with an offloaded flow, PNIC 112 accelerates the processing of the packet in PNIC 112. As discussed above, PNIC 112 processes at least a part of the processing of the packet. When PNIC 112 finishes the processing, the packet is sent to workload 106, such as via hypervisor 104.

Accordingly, hypervisor 104 does not offload short-lived, low throughput mice flows to PNIC 112. The mice flows may have throughput requirements that are low (e.g., the mice flows send very little data) and do not need accelerated mice flow processing techniques. Additionally, offloading of the mice flows may impact the packet processing efficiency of elephant flows in PNIC 112 due to the additional cycles spent in offloading the mice flows and removing the flows constantly. That is, the mice flows are short-lived and must be offloaded and removed from PNIC 112 when the mice flows end. The elephant flows are longer lasting and do not need to be removed as fast as mice flows. The hardware flow add, remove, and update operations may make packet processing jittery due to the immediate additional CPU cycles to perform the operations. For example, hypervisor 104 may perform frequent add and remove operations if mice flows are offloaded to PNIC 112 due to the mice flows short duration. This may cause data structures that maintain information for flows in PNIC 112 to update data frequently. The data structures are used for multiple flows and constant accesses for adding and removal of mice flows may cause cache misses when accessing the data structures because the data structures may not include the correct information or may not be available. Additionally, PNIC 112 may have limited hardware flow packet processing capacity and having PNIC 112 process packets for mice flows may use resources that would be better served processing packets for elephant flows. Accordingly, processing the packet in hardware in PNIC 112 for mostly elephant flows more efficiently uses the hardware resources that are available to perform hardware acceleration.

Receive Side Scaling

Receive side scaling may be performed on the receive side of network traffic. For example, a host 102 that receives a packet being sent by another host performs receive side scaling as a hardware acceleration technique. As will be discussed below, in some embodiments, a process is used at a source host 102 to tag packets in elephant flows. Then, a process in a destination host 102 uses the tags to identify packets that are associated with elephant flows and assigns the packets to a queue that is designated for elephant flows.

Figure 4:
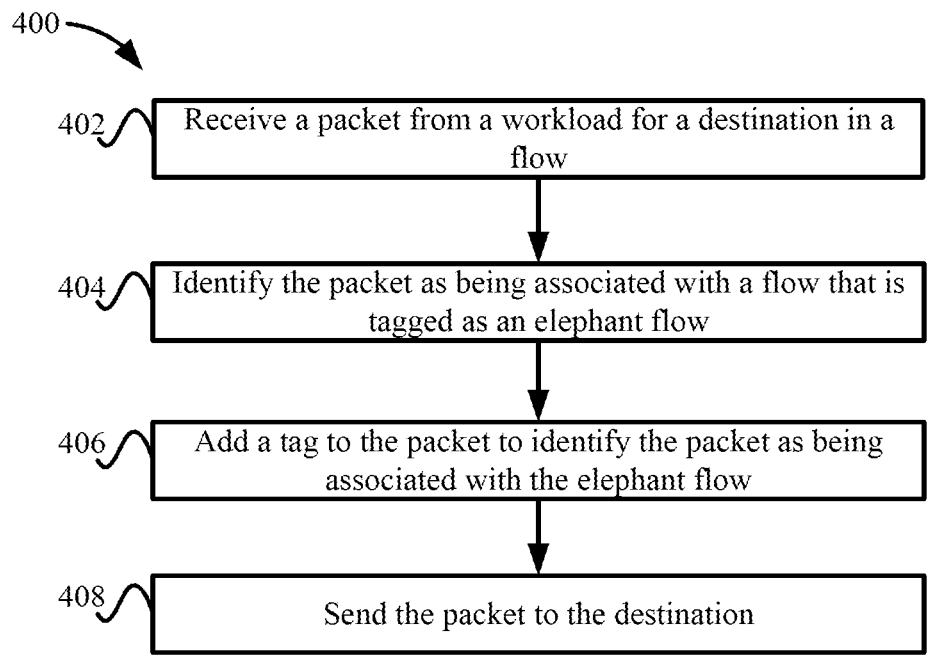
FIG. 4 depicts a simplified flowchart for configuring elephant flows at a source host to enable specialized handling of flows for receive side scaling according to some embodiments.

FIG. 4 depicts a simplified flowchart 400 for configuring elephant flows at a source host 102 to enable specialized handling of flows for receive side scaling according to some embodiments. Receive side scaling is performed at a destination host 102; however, to identify packets that are associated with elephant flows at destination host 102, a source host 102 may tag packets that are associated with elephant flows. In the process, at 402, flow analyzer 118 in source host 102 receives a packet from a workload 106 for a destination in a flow. The destination may be a workload 106 in a destination host 102 or another device.

At 404, flow analyzer 118 identifies the packet as being associated with a flow that is tagged as an elephant flow. Techniques described above to identify a packet associated with a flow in flow table 120 may be used. Then, at 406, flow analyzer 118 adds information, such as a tag, to the packet to identify the packet as being associated with an elephant flow. The tag may be any information that can indicate the packet is associated with an elephant flow. For example, flow analyzer 118 may set a flag to a value in the packet header when the packet is associated with an elephant flow. The tag in this case may be the indicator for the packet to identify the packet as being associated with an elephant flow.

After tagging the packet, at 408, host 102 sends the packet to the destination host 102. For example, PNIC 112 in source host 102 sends the packet to physical network 116 to destination host 102. Although the above method is described, other methods may be used to indicate the packet is associated with an elephant flow. For example, source host 102 may communicate information from flow table 120 to other hosts.

Figure 5:
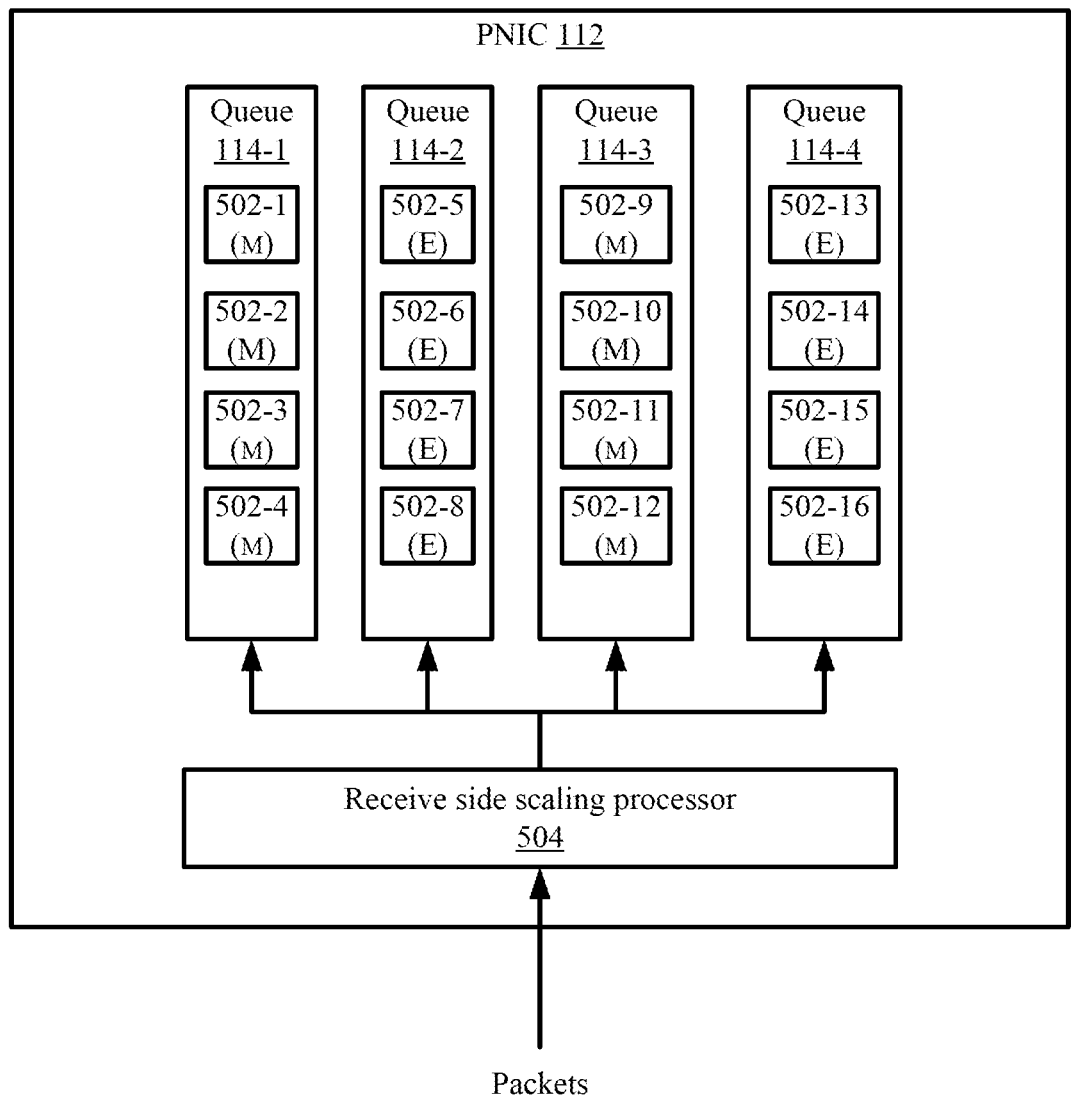
FIG. 5 depicts an example of a physical network interface card in a destination host to perform receive side scaling according to some embodiments.

Destination host 102 then receives the packet and PNIC 112 processes the packet. FIG. 5 depicts an example of PNIC 112 in destination host 102 to perform receive side scaling according to some embodiments. PNIC 112 includes a receive side scaling processor 504 and queues 114-1 to 114-4. CPUs of destination host 102 may process packets from queues 114. Receive side scaling allows inbound network traffic to be processed by multiple CPUs. For example, each queue 114 may be associated with a CPU. Distributing the receive side processing among the CPUs may reduce interrupts due to overloading a single CPU, and also reduces network latency.

Receive side scaling processor 504 receives packets and can map the packets to queues 114. In some embodiments, receive side scaling processor 504 may include hardware logic that can map packets to queues, such as programmable filters may be used to map packets from flows to specific queues 114. The filters may use a function that maps information from the packet to a queue. Also, receive side scaling processor 504 may use software to map the packets to the queues.

In some embodiments, some queues 114 may be designated for processing elephant flows. For example, queue 114-2 and queue 114-4 may be designated for processing packets for elephant flows. In this case, queue 114-2 and queue 114-4 may not process packets for non-elephant flows (e.g., mice flows) and only process packets for elephant flows. This configuration may free queue 114-1 and queue 114-3 to process packets for mice flows. It is noted that once a flow is mapped to a queue 114, all the packets are typically mapped to the same queue.

In FIG. 5, packets 502 are designated as being associated with mice flows (M) or elephant flows (E). As shown, queue 114-1 is processing packets 502-1 to 502-4 for mice flows; queue 114-2 is processing packets 502-5 to 502-8 for elephant flows; queue 114-3 is processing packets 502-9 to 502-12 for mice flows; and queue 114-4 is processing packets 502-13 to 502-16 for elephant flows. By mapping packets for elephant flows to queues that are designated for elephant flows, the receive side scaling processing avoids problems caused by elephant flows, such as head-of-line blocking delays. In the head-of-line blocking delay, an elephant flows may fill a queue with packets due to the high throughput nature of the elephant flow. However, latency-sensitive packets from mice flows may wait behind those packets in the queue. For example, in queue 114-2, if packets 502-5 to 506-8 are associated with elephant flows, a packet for a mice flow that is behind those packets in queue 114-2 has to wait for packets 502-5 to 506-8 to be processed since the packets in the queue may be processed in a first in first out manner. Although four packets are discussed, there may be more packets ahead of a packet for a mice flow further increasing the delay in processing the packet for the mice flow. The delay may cause latency in receiving the packets in the mice flow, which may cause problems for an application that is latency sensitive. Accordingly, if packets from mice flows are mapped to queues that are not processing packets for the elephant flows, then the packets may be processed in the queues 114 more efficiently as these queues may not experience a large backlog of packets from a large elephant flow. For example, if mice flows are not transferring a large amount of data, then the packets may not experience a large wait time in a queue that is only processing packets for mice flows.

Figure 6:
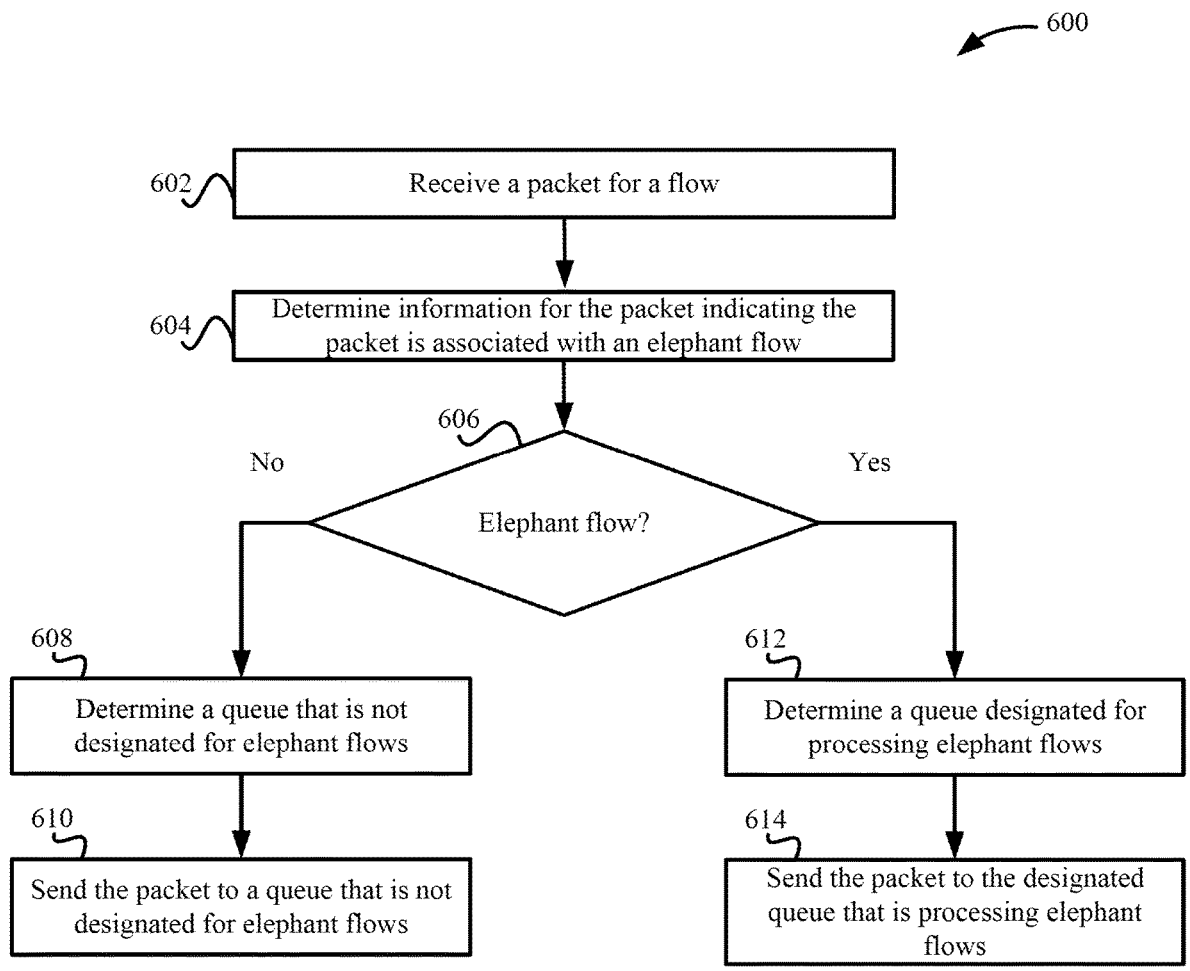
FIG. 6 depicts a simplified flowchart of a method for performing receive side scaling at the destination host according to some embodiments.

The following will describe one method of processing packets at receive side scaling processor 504. FIG. 6 depicts a simplified flowchart 600 of a method for performing receive side scaling at destination host 102 according to some embodiments. At 602, receive side scaling processor 504 receives a packet for a flow. At 604, receive side scaling processor 504 determines information for the packet indicating the packet is associated with an elephant flow, if any. For example, receive side scaling processor 504 may inspect the packet header and determine whether the packet header includes a tag that indicates it is associated with an elephant flow. Receive side scaling processor 504 may associate a queue 114 with the flow at that point. In some embodiments, receive side scaling processor 504 may set a filter to direct packets for the flow to the same queue 114. The filter may be based on different information to direct the packets to a queue 114. For example, the tag in the packet may be used as a filter to direct the packet to an assigned queue 114. The filter may use other information, such as identification information for the flow. Thereafter as destination host 102 receives more packets for the flow, receive side scaling processor 504 applies the filter in PNIC 112 for that flow to direct packets for the flow to the same queue 114. Although this method is described, other methods may be used.

At 606, receive side scaling processor 504 determines if the packet is associated with an elephant flow. The tag may be used as an indicator for determining whether the flow is associated with an elephant flow. If the packet is not associated with an elephant flow, this may mean the packet is associated with a mice flow. At 608, receive side scaling processor 504 determines a queue 114 that is not designated for elephant flows. Then, at 610, receive side scaling processor 504 sends the packet to queue 114 that is not designated for elephant flows in PNIC 112. For example, if hardware queues in PNIC 112 are being used, receive side scaling processor 504 sends the packet to queue 114-1 or queue 114-3.

If the packet is associated with an elephant flow, at 612, receive side scaling processor 504 determines a queue 114 that is designated for processing elephant flows. receive side scaling processor 504 may determine queue 114 based on a filter or other method. Then, at 614, receive side scaling processor 504 sends the packet to the designated queue 114 that is processing elephant flows. For example, if hardware queues in PNIC 112 are being used, receive side scaling processor 504 sends the packet to queue 114-2 or queue 114-4.

Accordingly, by mapping packets for elephant flows to separate queues from queues that are processing packets for mice flows, head-of-line blocking is avoided. This may avoid delays in mice flows that are blocked by a large number of packets in queues for elephant flows.

Migration of Workloads

Figure 7:
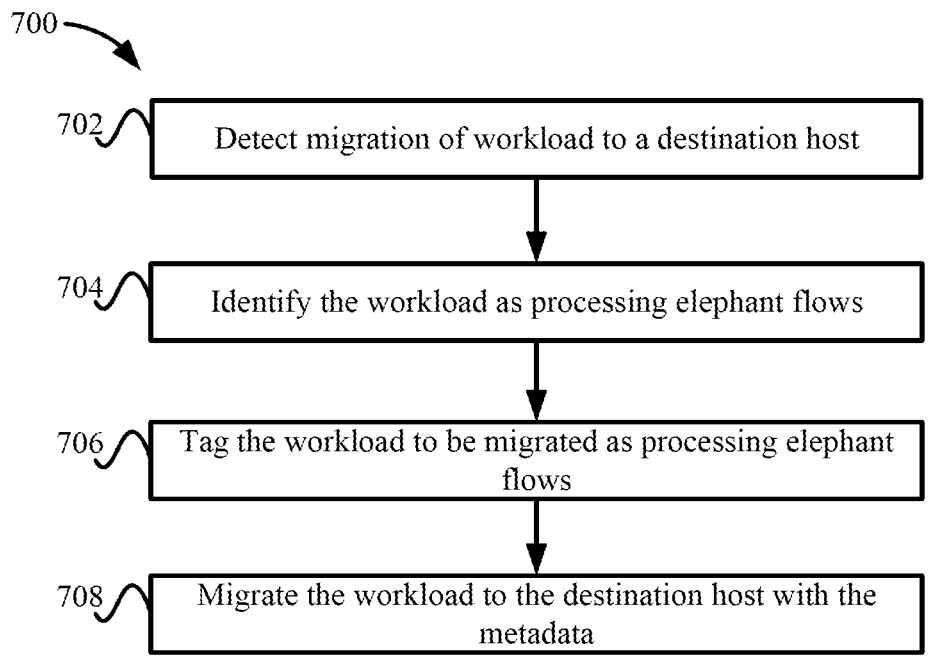
FIG. 7 depicts a simplified flowchart of a method for performing migration of workloads that are associated with elephant flows according to some embodiments.

Workloads 106 may migrate from a first host 102 to a second host 102. By using the tagging of workloads 106, network processing of packets for the migrated flows associated with workloads 106 may be proactively processed as elephant flows using the hardware acceleration techniques. FIG. 7 depicts a simplified flowchart 700 of a method for performing migration of workloads that are associated with elephant flows according to some embodiments. At 702, flow analyzer 118 detects migration of a workload from a source host 102 to a destination host 102. At 704, flow analyzer 118 identifies workload 106 as being a workload that is processing elephant flows. Flow analyzer 118 may make the determination using different criteria. In some embodiments, flow analyzer 118 may determine whether workload 106 has been tagged as being associated with processing elephant flows. For example, a workload may have been tagged in flow table 120, which means all flows for workload 106 is designated as elephant flows. In other embodiments, workload 106 may not have been tagged, but other criteria may qualify workload 106 as warranting being tagged. For example, flow analyzer 118 may determine if workload 106 has a number of flows that have been tagged as elephant flows that is over a threshold. Also, flow analyzer 118 may only identify certain flows as being elephant flows and include identification information for the certain flows. Any of the above methods may be used to determine that the workload processes elephant flows.

At 706, flow analyzer 118 may tag the workload to be migrated as being associated with processing elephant flows. For example, flow analyzer 118 creates and includes metadata for workload 106 that indicates the workload processes elephant flows. The tag may be considered the indicator in this case. Then, at 708, source host 102 migrates the workload to a destination host 102 with the metadata.

Figure 8:
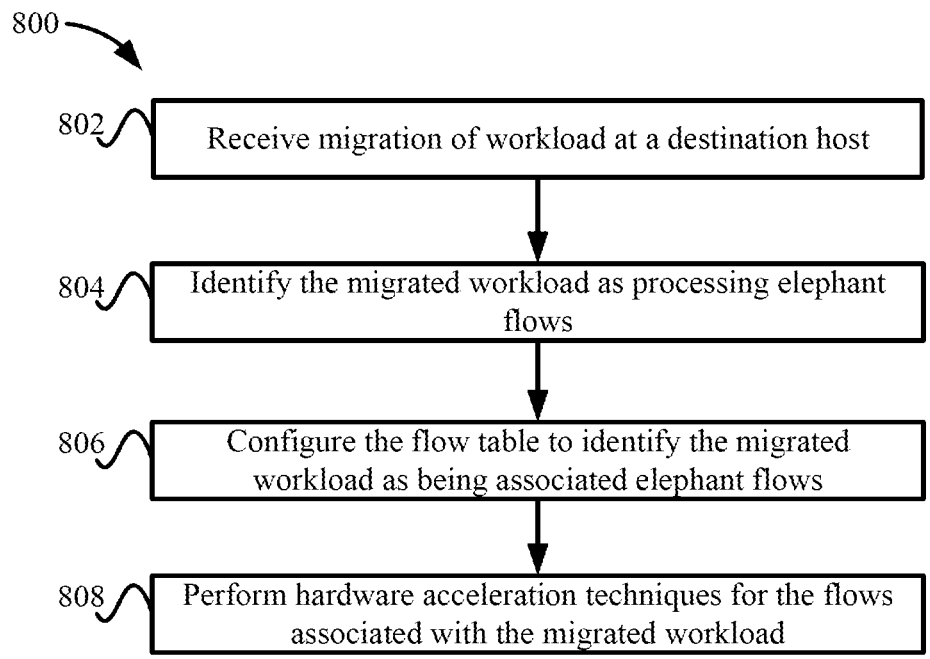
FIG. 8 depicts a simplified flowchart of a method for processing a migrated workload at the destination host according to some embodiments.

FIG. 8 depicts a simplified flowchart 800 of a method for processing a migrated workload 106 at destination host 102 according to some embodiments. At 802, flow analyzer 118 receives a migration of a workload at destination host 102. At 804, flow analyzer 118 identifies the migrated workload 106 as processing elephant flows. For example, flow analyzer 118 may determine whether a tag is set in metadata for workload 106 that indicates the migrated workload 106 processes elephant flows.

At 806, flow analyzer 118 may configure flow table 120 to identify the migrated workload 106 as being associated with elephant flows. For example, flow analyzer 118 may tag an identifier for the migrated workload 106 in flow table 120. In other examples, flow analyzer 118 may only tag certain flows for migrated workload 106 as being associated with an elephant flow if only certain flows were identified. At 808, flow analyzer 118 may perform hardware acceleration techniques for flows associated with the migrated workload 106.

Accordingly, hardware acceleration techniques may be performed proactively when workload 106 is migrated. For example, flow analyzer 118 does not have to wait to classify flows for migrated workload 106 as elephant flows by counting a number of bytes that are transferred through the flow and waiting until the number reaches a threshold. Rather, flow analyzer 118 may immediately classify flows as being elephant flows and perform hardware acceleration techniques immediately upon migration.

Conclusion

Accordingly, by tagging flows as elephant flows, hardware acceleration techniques may be more efficiently performed. Hardware flow offload may be performed for flows that benefit more from hardware flow offloading. Also, receive side scaling may benefit mice flows by allocating queues for elephant flows. The above may increase the efficiency of the hardware offload or receive side scaling operations.

Embodiments

In some embodiments, a method comprising: receiving a packet for a flow associated with a workload; based on an indicator for the flow, determining whether the flow corresponds to one of an elephant flow or a mice flow; and only when the flow is determined to correspond to an elephant flow, performing a hardware acceleration operation on the packet.

In some embodiments, performing the hardware acceleration operation comprises: offloading an operation on the packet from a network stack to a physical network interface card when the flow is associated with the first classification; and performing the operation using the physical network interface card.

In some embodiments, the network stack performs another operation on the packet.

In some embodiments, performing the hardware acceleration operation comprises: storing identification information for a set of flows associated with a set of workloads in a table based on network traffic associated with respective flows or workloads; determining that identification information for the flow is found in the table, wherein the flow table identifies the flow as being associated with the elephant flow.

In some embodiments, performing the hardware acceleration operation comprises: storing the packet in a queue associated with a physical network interface card, wherein the queue is associated with packets from one or more flows corresponding to elephant flows.

In some embodiments, a first queue stores packets for one or more flows corresponding to elephant flows, and a second queue stores packets for one or more flows that correspond to mice flows.

In some embodiments, performing the hardware acceleration operation comprises: tagging a workload to indicate that the workload is associated with elephant flows; and migrating the workload to a device, wherein information indicating the workload is associated with elephant flows is sent to the device to allow the device to identify a flow associated with the workload as corresponding to the elephant flow.

In some embodiments, a non-transitory computer-readable storage medium containing instructions, that when executed, control a computer system to be operable for: receiving a packet for a flow associated with a workload; based on an indicator for the flow, determining whether the flow corresponds to one of an elephant flow or a mice flow; and only when the flow is determined to correspond to an elephant flow, performing a hardware acceleration operation on the packet.

In some embodiments, performing the hardware acceleration operation comprises: offloading an operation on the packet from a network stack to a physical network interface card when the flow is associated with the first classification; and performing the operation using the physical network interface card.

In some embodiments, the network stack performs another operation on the packet.

In some embodiments, performing the hardware acceleration operation comprises: storing identification information for a set of flows associated with a set of workloads in a table based on network traffic associated with respective flows or workloads; determining that identification information for the flow is found in the table, wherein the flow table identifies the flow as being associated with the elephant flow.

In some embodiments, performing the hardware acceleration operation comprises: storing the packet in a queue associated with a physical network interface card, wherein the queue is associated with packets from one or more flows corresponding to elephant flows.

In some embodiments, a first queue stores packets for one or more flows corresponding to elephant flows, and a second queue stores packets for one or more flows that correspond to mice flows.

In some embodiments, performing the hardware acceleration operation comprises: tagging a workload to indicate that the workload is associated with elephant flows; and migrating the workload to a device, wherein information indicating the workload is associated with elephant flows is sent to the device to allow the device to identify a flow associated with the workload as corresponding to the elephant flow.

In some embodiments, an apparatus comprising: one or more computer processors; and a non-transitory computer-readable storage medium comprising instructions, that when executed, control the one or more computer processors to be operable for: receiving a packet for a flow associated with a workload; based on an indicator for the flow, determining whether the flow corresponds to one of an elephant flow or a mice flow; and only when the flow is determined to correspond to an elephant flow, performing a hardware acceleration operation on the packet.

In some embodiments, performing the hardware acceleration operation comprises: offloading an operation on the packet from a network stack to a physical network interface card when the flow is associated with the first classification; and performing the operation using the physical network interface card.

In some embodiments, the network stack performs another operation on the packet.

In some embodiments, performing the hardware acceleration operation comprises: storing identification information for a set of flows associated with a set of workloads in a table based on network traffic associated with respective flows or workloads; determining that identification information for the flow is found in the table, wherein the flow table identifies the flow as being associated with the elephant flow.

In some embodiments, performing the hardware acceleration technique operation comprises: storing the packet in a queue associated with a physical network interface card, wherein the queue is associated with packets from one or more flows corresponding to elephant flows.

In some embodiments, a first queue stores packets for one or more flows corresponding to elephant flows, and a second queue stores packets for one or more flows that correspond to mice flows.

In some embodiments, performing the hardware acceleration operation comprises: tagging a workload to indicate that the workload is associated with elephant flows; and migrating the workload to a device, wherein information indicating the workload is associated with elephant flows is sent to the device to allow the device to identify a flow associated with the workload as corresponding to the elephant flow.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
receiving a packet for a flow;
based on an indicator for the flow, determining whether the flow corresponds to one of first classification or a second classification, the first classification being associated with a first duration of less than a first threshold, the second classification being associated with a second duration of greater than a second threshold; and
based on a determination that the flow corresponds to an elephant flow, enabling a hardware acceleration operation on the packet.

2. The method of claim 1, wherein enabling the hardware acceleration operation comprises:
offloading an operation on the packet from a network stack to a physical network interface card when the flow is associated with a second classification; and
performing the hardware acceleration operation using the physical network interface card.

3. The method of claim 1, wherein enabling the hardware acceleration operation comprises:
receiving the packet at a physical network interface card; and
performing the hardware acceleration operation in the physical network interface card.

4. The method of claim 1, wherein enabling the hardware acceleration operation comprises:
storing identification information for a set of flows associated with a set of workloads in a table based on network traffic associated with respective flows or workloads; and
determining that identification information for the flow is found in the table, wherein the flow table identifies the flow as being associated with the second classification.

5. The method of claim 1, wherein enabling the hardware acceleration operation comprises:
storing the packet in a queue associated with a physical network interface card, wherein the queue is associated with packets from one or more flows corresponding to second classifications.

6. The method of claim 5, wherein:
a first queue stores packets for one or more flows corresponding to second classifications; and
a second queue stores packets for one or more flows corresponding to first classifications.

7. The method of claim 1, wherein enabling the hardware acceleration operation comprises:
tagging a workload to indicate that the flow is associated with second classifications; and
migrating the workload to a device, wherein information indicating the workload is associated with second classifications is sent to the device to allow the device to identify a flow associated with the workload as corresponding to the second classification.

8. A non-transitory computer-readable storage medium storing a first program for executing by a processing unit of a computer, the program comprising sets of instructions for:
receiving a packet for a flow associated with a workload;
based on an indicator for the flow, determining whether the flow corresponds to one of a second classification or a first classification, the first classification being associated with a first data size of less than a first threshold, the second classification being associated with a second data size of greater than a second threshold;
when the flow is determined to correspond to a second classification, directing the packet to a physical network interface card (PNIC) to perform an operation; and
when the flow is determined to correspond to a first classification, directing the packet to a second program executing on the computer to perform the operation on the packet.

9. The non-transitory computer-readable storage medium of claim 8, wherein the second program is a network stack of the computer, wherein directing the packet to the PNIC comprises:
offloading the operation on the packet from the network stack to the PNIC; and
performing the operation using the PNIC.

10. The non-transitory computer-readable storage medium of claim 8, the program further comprising sets of instructions for:
storing identification information for a set of flows associated with a set of workloads in a table based on network traffic associated with respective flows or workloads; and
determining that identification information for the flow is found in the table, wherein the flow table identifies the flow as being associated with the second classification.

11. The non-transitory computer-readable storage medium of claim 8, wherein directing the packet to the PNIC comprises:
storing the packet in a queue associated with the PNIC, wherein the queue is associated with packets from one or more flows corresponding to second classifications.

12. The non-transitory computer-readable storage medium of claim 11, wherein:
a first queue stores packets for one or more flows corresponding to second classifications; and
a second queue stores packets for one or more flows corresponding to first classifications.

13. The non-transitory computer-readable storage medium of claim 8, the program further comprising sets of instructions for:
tagging a workload to indicate that the workload is associated with second classifications; and
migrating the workload to a device, wherein information indicating the workload is associated with second classifications is sent to the device to allow the device to identify a flow associated with the workload as corresponding to the second classification.

14. An apparatus comprising:
one or more computer processors; and
a non-transitory computer-readable storage medium comprising instructions, that when executed, control the one or more computer processors to be operable for:
receiving a packet for a flow;
based on an indicator for the flow, determining whether the flow corresponds to one of a second classification or a first classification, the first classification being associated with a first duration of less than a first threshold, the second classification being associated with a second duration of greater than a second threshold; and only when the flow is determined to correspond to a second classification, enabling a hardware acceleration operation.

15. The apparatus of claim 14, wherein enabling the hardware acceleration operation comprises:

offloading an operation on the packet from a network stack to a physical network interface card when the flow is associated with the second classification; and performing the hardware acceleration operation using the physical network interface card.

16. The apparatus of claim 14, wherein enabling the hardware acceleration operation comprises:

receiving the packet at a physical network interface card; and performing the hardware acceleration operation in the physical network interface card.

17. The apparatus of claim 14, wherein enabling the hardware acceleration operation comprises:

storing identification information for a set of flows associated with a set of workloads in a table based on network traffic associated with respective flows or workloads; and determining that identification information for the flow is found in the table, wherein the flow table identifies the flow as being associated with the second classification.

18. The apparatus of claim 15, wherein enabling the hardware acceleration technique operation comprises:

storing the packet in a queue associated with a physical network interface card, wherein the queue is associated with packets from one or more flows corresponding to second classifications.

19. The apparatus of claim 14, wherein:

a first queue stores packets for one or more flows corresponding to second classifications; and a second queue stores packets for one or more flows corresponding to first classifications.

20. The apparatus of claim 14, wherein enabling the hardware acceleration operation comprises:

tagging a workload to indicate that the flow is associated with the second classification; and migrating the workload to a device, wherein information indicating the workload is associated with second classification is sent to the device to allow the device to identify a flow associated with the workload as corresponding to an elephant flow.

\* \* \* \* \*